US006816812B2

(12) United States Patent
Giacobbe et al.

(10) Patent No.: US 6,816,812 B2
(45) Date of Patent: Nov. 9, 2004

(54) METHODS AND APPARATUS FOR ESTIMATING MOISTURE ABSORPTION BY HYGROSCOPIC MATERIALS

(75) Inventors: Frederick W. Giacobbe, Naperville, IL (US); Michael G. Pizzo, Yorkville, IL (US)

(73) Assignee: American Air Liquide, Inc., Fremont, CA (US)

( * ) Notice: Subject to any disclaimer, the term of this patent is extended or adjusted under 35 U.S.C. 154(b) by 28 days.

(21) Appl. No.: 10/017,403

(22) Filed: Dec. 14, 2001

(65) Prior Publication Data

US 2002/0095268 A1 Jul. 18, 2002

Related U.S. Application Data

(60) Provisional application No. 60/256,286, filed on Dec. 18, 2000.

(51) Int. Cl.[7] ............................................. G06F 17/18
(52) U.S. Cl. ..................................................... 702/181
(58) Field of Search ........................ 702/181; 399/113; 96/108; 428/215, 378; 385/143; 106/772, 805; 604/374, 370; 528/102; 422/9; 210/690; 252/188, 194; 359/883; 162/72; 128/898; 34/472; 423/243

(56) References Cited

U.S. PATENT DOCUMENTS 5,977,429 A * 11/1999 Phillips et al. .............. 604/370

OTHER PUBLICATIONS

ANSI/IPC–SM–786A, Procedures for Characterizing and Handling of Moisture/Reflow Sensitive ICs, IPC, Jan. 1995, Northbrook, Illinois.

Baluck, Michael J., Rose, Gregory L., Viramani, Nick, Fundamentals of Plastic Encapsulated Microcircuits (PEMS) for Space Applications, NASA TECDOCS, Feb. 1995, http://epims.gsfc.nasa.gov/ctre/act/techdocs/pems.

Fukuzawa, I., Ishiguro, S., Nanbu, S., Moisture Resistance Degradation of Plastic LSIs by Reflow Soldering, Proceedings of International Reliability Physics Symposium, 1985, pp. 192–197.

Gallo, Anthony A., Munamarty, Ramesh, Popcorning: A Failure Mechanism in Plastic–Encapsulated Microcircuits, Dexter Corporation Technical Paper, Sep. 1995, pp. 1–8, Olean, New York.

Gannamani, Ranjit, Pecht, Michael, An Experimental Study of Popcorning in Plastic Encapsulated Microcircuits, IEEE Transactions on Compnents, Packaging and Manufacturing Technology, Part A, Jun. 1996, pp. 194–201, vol. 19, No. 2.

Holcomb, Ken, Ryan, Lisa, Suro, Enrique, Moisture in Liquid Epoxy Encapsulant and Its Effect on SMDs, Dexter Corporation Technical Paper, Dec. 1994, pp. 1–8, Olean, New York.

Hua, Fay, Leong, Bill, A Moisture Induced Failure in FCBGA Packages During Multiple Reflow, Proceedings of the Technical Program: Surface Mount International Conference and Exposition, 1998, pp. 14–17, San Jose, California.

(List continued on next page.)

*Primary Examiner*—John Barlow
*Assistant Examiner*—Tung Lau
(74) *Attorney, Agent, or Firm*—Linda K. Russell

(57) ABSTRACT

Disclosed are methods and apparatus to measure specific mass increases (due to the absorption of moisture) that occur in materials and for predicting moisture absorption in materials. In one method, pre-dried plastic encapsulated microchip packages (PEMs) are exposed to moist air over a period of time and moisture absorption is determined over a period of time resulting in prediction of moisture absorption of a particular material and determination of methods of care and storage of material to prevent excessive moisture absorption.

24 Claims, 5 Drawing Sheets

OTHER PUBLICATIONS

Hutchins, Charles L., Time and Temperature Requirements for Surface Mount Soldering, Proceedings of the Technical Program: NEPCON West, 1990, pp. 288–297, Anaheim, California.

Ilyas, Qazi S.M., Poborets, Bella, Evaluation of Moisture oSensitivity of Surface Mount Plastic Packages, Proceedings of the ASME Conference, 1993, pp. 145–156, New Orleans, Louisiana.

Ito, S., Nishioda, T., Oizumi, S., Ikemura, K., Igarashi, K., Molding Compounds for Thin Surface Mount Packages and Large Chip Semiconductor Devices, Proceedings of the $39^{th}$ International Reliability Physics Symposuim, 1991, pp. 190–197.

Kitano, Makoto, Nishimura, Asao, Kawai, Sueo, Analysis of Package Cracking During Reflow Soldering Process, Proceedings of the $26^{th}$ International Reliability Physics Symposium, 1988, pp. 90–95.

McCluskey, P., Munamarty, R., Pecht, M., Popcorning in PBGA Packages During IR Reflow Soldering, Microelectronics International, Jan. 1997, pp. 20–23, vol. 42.

Pecht, Michael, Govind, Anand, In–Situ Measurements of Surface Mount IC Package Deformations During Reflow Soldering, IEEE Transactions of Components, Packaging and Manufacturing Technology, Part C, Jul. 1996, pp. 1–5, vol. 20, No. 3.

Pecht, M., Ranade, Y., Pecht, J., Effect of Delamination on Moisture Accelerated Failures in Plastic Encapsulated Microsircuits, Circuit World, 1997, pp. 11–15, vol. 23, No. 4.

Shan, X., Agarwal, R.K., Pecht, M., Effect of Humidity Cycling on Reliability of Overlaid High Density Interconnects, Proceedings IEEE Multichip Module Conference, Mar. 1992, pp. 106–109.

Theriault, Martin, Carsac, C., Blostein, P., Evaluating Nitrogen Storage as an Alternative to Bakin Moisture/Reflow Sensitive Components, Proceedings of the Technical Program: NEPCON West, 2000, Anaheim, California.

Totten, Rene C., Managing Moisture–Sensitive Devices, Part 1: External Material Pipeline Considerations, Circuits Assembly, Sep. 1996A, pp. 56–64.

Totten, Rene C., Managing Moisture–Sensitive Devices, Part 1: Internal Material Pipeline Considerations, Circuits Assembly, Oct. 1996B, pp. 34–38.

Tubbs, Tara R., Gallo, Anthony A., Accelerated Popcorn Testing of High Solder–Reflow Crack Resistant Molding Compounds, Dexter Corporation Technical Paper, Apr. 1996, pp. 1–7, Olean, New York.

Yalamanchiii, P., Gannamani, R., Munanarty, R., McCluskey, P., Christou, A., Optimum Processing Prevents PQFP Popcorning, Surface Mount Technology, May 1995, pp. 39–42.

Chong, D., Dunn, C., Lewis, T., Leblanc, J., Moisture Sensitivity of Surface Mount Plastic Packages, Proceedings of the Technical Program: Surface Mount International Conference and Exposition, 1992, pp. 421–426, vol. 1, Edina, Minnesota.

Shook, R.L., Goodelle, J.P., Handling of Highly–Moisture Sensitive Components—An Analysis of Low–Humidity Containment and Baking Schedules.

Intel Corp., Moisture Sensitivity/Desiccant Packaging/Handling of PSMCs, 2000 Packaging Databook, 1993, pp. 8–1—8–27.

IPC/JEDEC J–STD–020A, Moisture/Reflow Sensitivity Classification for Non–Hermetic Solid State Surface Mount Devices, IPC, Apr. 1999.

IPC/JEDEC J–STD–033, Standard for Handling, Packing, Shipping and Use of Moisture/Reflow Sensitive Surface Mount Devices, IPC, Apr. 1999.

* cited by examiner

METHODS AND APPARATUS FOR ESTIMATING MOISTURE ABSORPTION BY HYGROSCOPIC MATERIALS

RELATED APPLICATION

This application is a non-provisional application claiming priority to provisional U.S. application Ser. No. 60/256,286 filed on Dec. 18, 2000 and is hereby incorporated by reference in its entirety herein.

FIELD OF THE INVENTION

The present invention relates generally to the field of moisture absorption in hygroscopic materials, and more specifically to methods and apparatus for predicting moisture absorption in such materials.

BACKGROUND OF THE INVENTION

Certain types of Plastic Encapsulated Microchip (PEM) packages that are exposed to humid air, prior to a reflow soldering process (which attaches these types of components to printed electronic circuit boards), are capable of absorbing significant quantities of water vapor. It is also known that some unprotected PEM packages are capable of absorbing so much moisture, due to their exposure to humidified air, that the rapid heating effect during subsequent soldering causes them to fracture, crack, or explode. "Popcorning" is a term that is often applied to describe this effect. Typically, this kind of damage may cause immediate, or somewhat delayed, fatal defects in the electrical operation of these PEMs. Additional information and much more detail regarding the popcorning effect, as it relates to PEMs, is available in many other previously published papers [e.g., Baluck et al., 1995; Fukuzawa et al., 1985; Gallo and Munamarty, 1995; Gannamani and Pecht, 1996; Holcomb et al., 1994; Hua and Leong, 1998; Hutchins, 1990; Ilyas and Poborets, 1993; Ito et al., 1991; Kitano et al., 1988; Mahajan and Pecht, 1999; McCluskey et al., 1997; Oizumi et al., 1987; Pecht and Govind, 1997; Pecht et al., 1997; Shan et al., 1992; Shook, 1992; Theriault et al., 2000; Totten, 1996A and 1996B; Tubbs and Gallo, 1996; Yalamananchiii et al., 19951].

The specific amount of water vapor that can be absorbed within different types of PEMs depends significantly upon the type and configuration of the plastic encapsulating material that is used to enclose the interior electronic component(s) as well as the exposure time and relative humidity (RH) of the moist air that these devices are exposed to. For these reasons, actual moisture absorption rates, associated with specific PEMs exposed to well defined RH and temperature conditions, must be measured experimentally. And, although there are at least a few experimental studies related to this problem within the extant literature, many of these studies have focused upon moisture absorption measurements involving temperatures and RH conditions that are unlikely, if not (for all practical purposes) impossible within most electronic packaging and assembly environments. However, one of the best previous studies, known to the inventors, involving moisture absorption rates of PEMs and also containing the most realistic operating conditions, was published in a Surface Mount Technology (SMT) Proceedings volume in 1992 [Chong et al., 1992]. In that paper, the lowest controlled operating temperature and relative humidity condition was at 30 C and 60% RH. In addition, theoretical equations allowing predictions at other temperatures and RH conditions were developed. The dried PEMs studied during that work were also exposed for long time periods (up to 1,000 hr) to high humidity test atmospheres. However, although moisture pick up behavior could be estimated at ambient temperature conditions, that behavior was not measured directly.

Related art may be found in the following, some of which are referred to herein:

ANSI/IPC-SM-786A, Procedures for Characterizing and Handling of Moisture/Reflow Sensitive ICs. IPC, Northbrook, Ill. Sep. (1994).

Baluck, M. J., Rose, G. L., and Virmnani, Fundamentals of Plastic Encapsulated Microcircuits (PEMs) for Space Applications. NASA TECDOCS (1995).

Chong, D., Dunn, C., Lewis, T., and LeBlanc, J., Moisture Sensitivity of Surface Mount Plastic Packages. Proceedings of the Technical Program: Surface Mount International Conference and Exposition, Edina, Minn. Vol. 1, pp. 421–426 (1992).

Fukuzawa, I., Ishiguro, S., and Nanbu, S., Moisture Resistance Degradation of Plastic LSIs by Reflow Soldering. Proceedings of International Reliability Physics Symposium, pp. 192–197 (1985).

Holcomb, K., Ryan, L., and Suro, E., Moisture in Liquid Epoxy Encapsulant and its Effect on SMDs. Dexter Corporation Technical Paper, Olean, N.Y. December (1994).

Intel Corp., Moisture Sensitivity/Desiccant Packaging/Handling of PSMCs, 1993.

IPC/JEDEC J-STD-020A, Moisture/Reflow Sensitivity Classification for Non-Hermetic Solid State Surface Mount Devices. IPC, Northbrook, Ill. (1999).

IPC/JEDEC J-STD-033, Standard for Handling, Packaging, Shipping and Use of Moisture/Reflow Sensitive Surface Mount Devices. IPC, Northbrook, Ill. (1999).

Gallo, A. A. and Munamarty, R., Popcorning: A Failure Mechanism in Plastic Encapsulated Microcircuits. Dexter Corporation Technical Paper, Olean, N.Y. September (1995).

Gannamani, R. and Pecht, M., An Experimental Study of Popeorning in Plastic Encapsulated Microcircuits. IEEE Transactions on Components, Packaging, and Manufacturing Technology, Part A, Vol. 19, No. 2, pp. 194–201, June (1996).

Hua, F. and Leong, B., A Moisture Induced Failure in FCBGA Packages During Multiple Reflow. Proceedings of the Technical Program: Surface Mount International Conference and Exposition, San Jose, Calif. pp. 14–17 (1998).

Hutchins, C. L., Time and Temperature Requirements for Surface Mount Soldering. Proceedings of the Technical Program: NEPCON West, Anaheim, Calif. pp. 288–297 (1990).

Ilyas, Q. S. M. and Poborets, B., Evaluation of Moisture Sensitivity of Surface Mount Plastic Packages. Proceedings of the ASME Conference, New Orleans, La. pp. 145–156 (1993).

Ito, S., Nishioka, T., Oizumi, S., Ikemura, K., and Igarashi, K, Molding Compounds for Thin Surface Mount Packages and Large Chip Semiconductor Devices. Proceedings of the 39th International Reliability Physics Symposium, pp. 190–197 (1991).

Kitano, M., Nishimur, A., Kawai, S., and Nishi, K., Analysis of Package Cracking During Reflow Soldering Process. Proceedings of the 26th International Reliability Physics Symposium, pp. 90–95 (1988).

McCluskey, P., Munamarty, R., and Pecht, M., Popcorning in PBGA Packages During IR Reflow Soldering. Microelectronics International, Vol. 42, pp. 20–23, January (1997).

Pecht, M. and Govind, A., In-situ Measurements of Surface Mount IC Package Deformations During Reflow Soldering. IEEE Transactions on Components, Packaging, and Manufacturing Technology, Part C, Vol. 20, No. 3, July (1996).

Pecht, M., Ranade, Y., and Pecht, J., Effect of Delamination on Moisture Accelerated Failures in Plastic Encapsulated Microcircuits. Circuit World, Vol. 23, No. 4, pp. 11–15 (1997).

Shan, X., Agarwal, R., Pecht, M., and Evans, J., Effect of Humidity on Reliability of Overlaid High Density Interconnects. Proceedings IEEE Multichip Module age Conference, pp. 106–109, March (1992).

Shook, R. L., Moisture Sensitivity Characterization of Plastic Surface Mount Devices Using Scanning Acoustic Microscopy. Proceedings of International Reliability Physics Symposium, pp. 157–168 (1992).

Totten, C. R., Part I: Managing Moisture Sensitive Devices, Circuits Assembly, pp. 56–64, September (1996A).

Totten, C. R., Part II: Managing Moisture Sensitive Devices, Circuits Assembly, pp. 34–38, October (1996B).

Theriault, M., Carsac, C., and Blostein, P., Evaluating Nitrogen Storage as an Alternative to Baking Moisture/Reflow Sensitive Components. Proceedings of the Technical Program: NEPCON West, Anaheim, Calif. (2000).

Tubbs, T. R. and Gallo, A. A., Accelerated Popcorn Testing of High Solder Reflow Crack Resistant Molding Compounds. Dexter Corporation Technical Paper, Olean, N.Y. April (1996).

Yalamanchiii, P., Gannamani, R., Munamarty, R., McCluskey, P., and Christou, A., Optimum Processing Prevents Popcorning. Surface Mount Technology, pp. 39–42, May (1995).

It is thus desired to provide a method and apparatus for estimating moisture absorption by hygroscopic materials for obtaining a better understanding of the kinetics of the water absorption process that may take place at ambient temperatures, between air saturated (or nearly saturated) with moisture and certain initially dry PEM packages. It is an additional desire to provide a method and apparatus for estimating moisture absorption by hygroscopic materials that indicates the advantages of methods of storing PEM packages in order to minimize water absorption by the PEMs and thus inhibits the "popcorning" effect during subsequent reflow soldering. It is a further desire to provide a method and apparatus for estimating moisture absorption by hygroscopic materials that provide a quantitative indication of specific mass increases due to moisture absorption in pre-dried PEM specimens. It is a still further desire to provide a method and apparatus for estimating moisture absorption by hygroscopic materials that enables the rapid development of complete "families" of absorption isotherms from a minimal amount of "real" experimental data.

SUMMARY OF THE INVENTION

It is thus one feature of the present invention to provide a method and apparatus for estimating moisture absorption by hygroscopic materials.

It is a further feature to of the present invention to provide a method and apparatus for estimating moisture absorption by hygroscopic materials that enable prediction of moisture absorption at various relative humidity conditions for a material from minimal data of moisture absorption at specific, controlled relative humidity and temperature conditions for that material.

Accordingly, a method and apparatus for estimating moisture absorption by hygroscopic materials is provided. The estimating method and apparatus includes: a substantially air tight container adapted to hold a test specimen therein. The atmospheric conditions within the container may be controlled by means such as gas injection and withdrawal. Further, the relative humidity of the atmosphere may be controlled by means such as, but not limited to, gas injection and/or humidifying material disposed within the container. It may be desired to include means for circulating the atmosphere within the container. The container may also include atmospheric sensing means to monitor atmospheric conditions within the container. Such conditions may include temperature and humidity.

One method of predicting the moisture absorption rate in a material includes the steps of: drying the material for a time sufficient to remove residual moisture; placing the material within a controlled atmosphere container; exposing the material to an environment of a known controlled relative humidity in an inert gaseous atmosphere and controlled temperature; collecting data of moisture absorption over time and using curve fitting technique to fit the data to a curve using the equation $Y=aX^b$; where: a is a constant ranging from about 0.001 to about 1.0; b is a constant ranging from about 0.01 to about 10.0; Y is the mass increase in grams H20 per 100 grams of material; and X is humidification time in hours; wherein once constants a and b are found at said known controlled relative humidity and said controlled temperature for said material, assuming constant b is a constant value for the material, and constant a is a variable that is directly proportional to the relative humidity in an inert gaseous atmosphere; and modifying the variable a and holding the variable b constant to generate an expected moisture absorption mass gain versus time curve for a different specific relative humidity value.

Preferred are those methods wherein the known relative humidity ranges from 5 to 100%, and those methods wherein the material is a PEM or other electronic component.

Another aspect of the invention is an apparatus for creating a controlled moisture atmosphere, the apparatus comprising a sealed container adapted to contain a nearly saturated atmosphere of moist gas, the apparatus able to maintain said atmosphere by at least one wet fibrous material placed within a corresponding tray partially filled with water, the tray located inside of this container so the central region is available for holding a test specimen.

Preferred are apparatus wherein the moist gas may be circulated within the sealed container by a small internal electric fan. Also preferred are apparatus wherein the actual RH level and temperature within this controlled atmosphere chamber may be continuously monitored and recorded using RH and temperature probes inserted through hermetically sealed fittings welded into one end of the sealed container. In particularly preferred embodiments the RH and temperature probes may be combined in a single probe inserted through a single sealed fitting.

Other aspects of the invention will become apparent through reading the detailed description and claims which follow, which are illustrative only in nature.

The foregoing has outlined rather broadly the features and technical advantages of the present invention in order that the detailed description may be utilized singularly or in combination to achieve the invention as taught. Additional features and advantages to the invention will be described hereinafter which form the subject of the claims appended hereto.

BRIEF DESCRIPTION OF THE DRAWINGS

The foregoing and other features and aspects of the subject invention will be with reference to the accompanying drawings, wherein.

DESCRIPTION OF PREFERRED EMBODIMENTS

Figure 1:
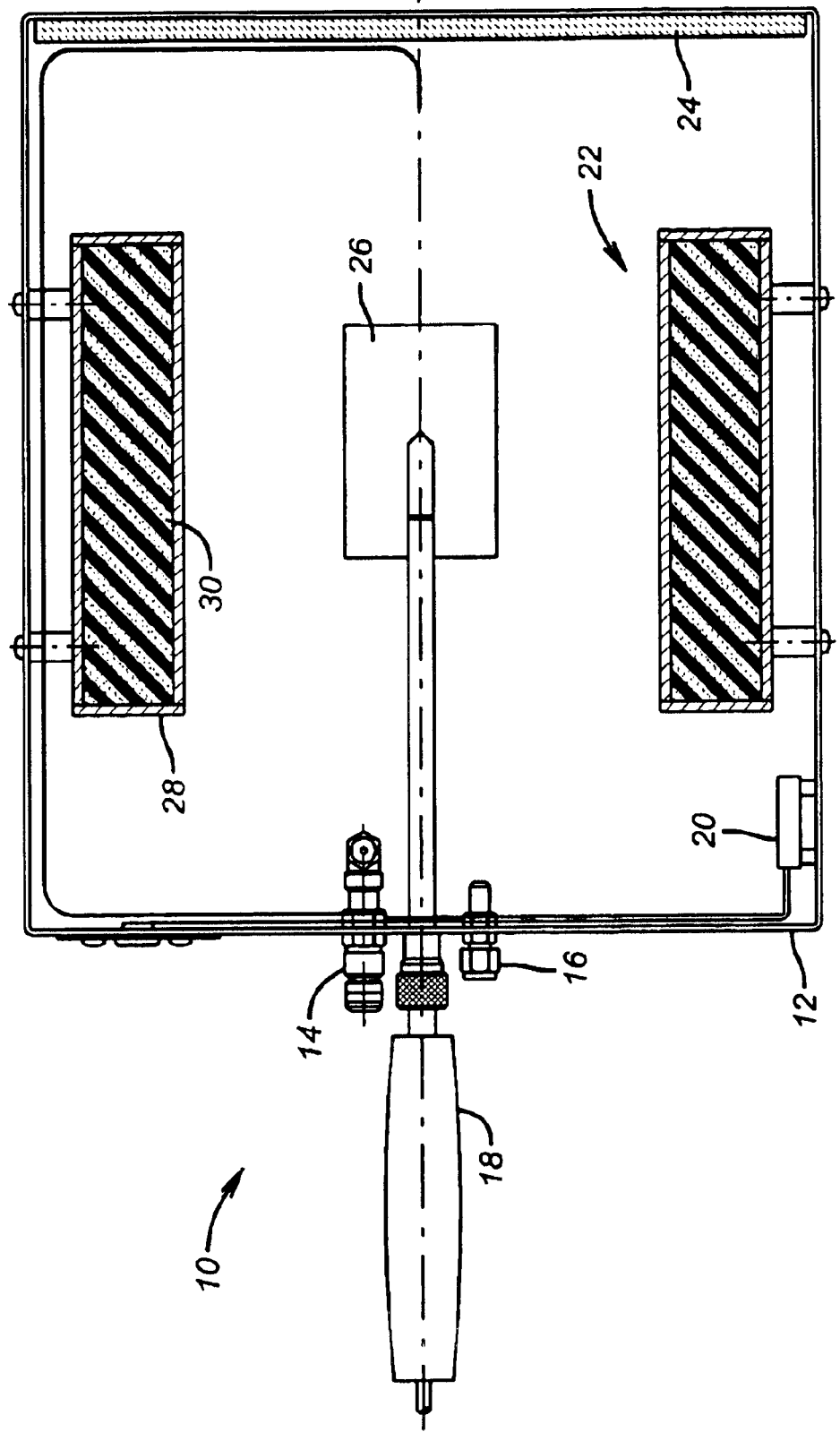
FIG. 1 is a side cross-sectional view of an apparatus in accordance with the present invention.

Refer now to the drawings wherein depicted elements are not necessarily shown to scale and wherein like or similar elements are designated by the same reference numeral through the several Figures.

FIG. 1 is a perspective view of a preferred apparatus for estimating moisture absorption by material generally denoted by the numeral 10. Moisture absorption estimating apparatus 10 includes a container 12, a gas inlet and outlet 14, 16, an atmospheric sensor 18, a circulating mechanism 20, a humidifying device 22, a viewing window 24, and a test specimen 26. Container 12 functions to form a space, and may be any size and shape suitable for testing, including but not limed to rectangular, cubical, spherical, and cylindrical.

Enclosed box or container 12 is a substantially air tight container. Container 12 may be constructed of various material suitable for the conditions to be induced within container 12. For example, in the following examples container 10 is constructed of a metal having an internal volume of approximately one (1) cubic foot. Although not shown, container 12 may have ports, doors, windows, and a sliding drawer or hinged section for entry into the interior thereof. A test specimen 26, such as a PEM, is positioned within container 12. Container 12 may further include a viewing window 24 constructed of a material such as, but not limited to, glass or plexiglass.

At least one and possibly a pair of humidifying devices 22 may be positioned within container 12. Humidifying devices 22 may be omitted, used singularly or in combination with a gas injected through gas inlet 14 to form the atmosphere within container 12, In FIG. 1, humidifying device 22 includes a tray 28 adapted for holding water and a sponge 30. Additionally, various gas compositions may be injected into container 12 through gas inlet 14 and exhausted through gas outlet 16, if desired. To maintain circulation of the atmosphere within container 12 a fan 20 is provided therein.

An atmospheric sensing probe 18 is preferably positioned to provide constant or intermittent monitoring and recording of conditions within container 12. For example, atmospheric probe 18 may be a Vaisala, Model HMI 33, RH/Temperature Probe having continuous monitoring and recording capabilities.

The method of operation of moisture absorption measuring apparatus 10 will be further described and understood in reference to the examples presented below.

EXPERIMENTAL DETAILS

PEM Packages

Initial experimental studies were performed using multiple "dummy" plastic ball grid array (BGA) and plastic leaded chip carrier (PLCC) devices. These components were identical to the "real" thing, as far as moisture sensitivity is concerned, because the only difference between them and similar (but real) components is their lack of an internal encapsulated electronic "chip". These internal chips typically make up only a small fraction of the total PEM mass and are inert with respect to moisture absorption. Neither of these device types were labeled by their manufacturers with moisture sensitivity level (MSL) ratings [ANSI/IPC-SM-786A, 1994; Intel Corp., 1993; EPC/EDEC J-STD-020A, 1999; and IEPC/JEDEC J-STD-033, 1999], but real PEMs of this type tend to be sensitive to moisture absorption. This is one of the reasons that these specific devices were initially selected for use in this experimental study.

Other PEM packages tested were real (not dummy) metric plastic quad flatpack packages (MQFPS) having a manufacturer's MSL rating of 3 (Note: MSL ratings generally vary between 1 and 6, wherein an MSL rating of 1 means that the PEM is practically insensitive to moisture absorption while a MSL rating of 6 means that the PEM is extremely sensitive to moisture absorption). Moisture absorption properties of these MQFPs were measured under the same conditions that were applied to the unrated BGAs and PLCCs.

The PEM BGAs (exact designation: PBGA676-w/die, Part No. 10724, Nominal Mass=ca. 4.3 g) and PLCCs (exact designation: PLCC84-T, Part No. 10105, Nominal Mass=ca. 6.9 g), referred to above, were obtained from Practical Components, Inc. (15211 Springdale Street, Huntington Beach, Calif. 92649). The MQFPs (exact designation: IC, 16Bit MCU, 20 MHz, 0/70 C, P-MQFP, Part No. SAB80C166M, Nominal Mass=1.6 g) were obtained from the Pioneer Standard Electronics Co. (2385 Edison Road, Twinsburg, Ohio 44087. The PBGAs were approximately 1.27 mm thick×35 mm square. They also contained 676 solder "bump" attachments. The PLCCs were about 4 mm thick and 29 mm square. They contained 84 solder attachment leads (21 on each side). The P-MQFPs were nearly 2 mm thick and 13 mm wide and 19 mm long. They contained 100 attachment leads (20 on each short side and 30 on each long side).

Drying Oven

Prior to testing, five identical PEM components at a time were dried together within an enclosed box furnace preheated to, and then maintained at, 125±3 C. All of the tested PEMs were heated in this way for 60±1 hr (in air). All subsequent measurements of mass increases, due to the exposure of these devices to saturated atmospheres of moist air, were made intermittently without any additional intervening heat treatments.

Controlled Moisture Environment

A controlled moisture environment, created within an "air tight" metal box 12, was employed during the moisture absorption phase of this study (see diagram in FIG. 1). Metal container 12 enclosed an internal volume of about one cubic foot. A nearly saturated atmosphere of moist air was created, and maintained, within enclosure 12 by two wet sponges 30 placed vertically within narrow and shallow rectangular metal trays 28 partially filled with water. Sponge trays 28 were located inside and near each side of container 12 so the central region was available for holding PEM test specimens 26. Moist air circulation within this enclosure was also maintained continuously by a small internal electric fan 20. The actual RH levels and temperatures, within this controlled atmosphere chamber, were continuously monitored and recorded using a Vaisala, Model HMI 33, RH/Temperature Probe 18. Probe 18 was inserted through a hermetically sealed fitting welded into the back end of the box. Throughout the initial series of measurements, the RH level and temperature of the air enclosed within this box was maintained at 95±5% and 23±2 C. This relatively high RH level was chosen as one of the initial condition parameters because it was easy to create and maintain and it produced the greatest possible PEM mass increases (due to the absorption of moisture at ambient temperatures) for any specific exposure time.

In a subsequent set of measurements, a 50/50 mixture of saturated air and dry air were pre-blended and then directed through gas inlet 14 into metal box 12 (but, without the internal wet sponges 30) in order to determine moisture absorption rates of the MQFPs, previously described, in a gaseous 50±5% RH environment.

During each set of moisture absorption test trials, five components 26 of one type were marked with numbers from one to five (initially) to provide for individual identification. Then, these parts were oven dried (as described above), weighed (dry), and then placed within the controlled atmosphere humidity chamber 12. Components 26 were intermittently, and individually, taken out of humidity box 12 and re-weighed to measure the amount of moisture absorbed up to that recorded weighing time. The weighing process was completed rapidly for each separate component 26, then that component 26 was returned to humidity box 12 and the next part 26 was weighed in turn. This weighing process was repeated periodically for at least 50 hours, for each component 26, from the initial start of the moist air exposure process. Masses (to the nearest 0.0001 g) and exposure times for each component were also recorded. Therefore, a quantitative measure of statistical variations in the experimental results (as a consequence of slight unavoidable variations in component fabrication/treatment conditions) was obtained.

Treatment of Laboratory Mass Data

Each of the nearly identical PEMs 26 had slightly different initial dry masses. They also differed significantly in mass from the other component types. So, all mass increases that were measured were "normalized" to a fictitious initial component "dry mass" of 100 g. In other words, all actual measured mass increases were adjusted to produce the mass increases that would have occurred if the initial dry mass of each PEM was exactly 100 g. Using this technique, it was possible to make better comparisons between the true relative mass increases of different types of PEMs as a function of time. An additional advantage of this approach is that mass increases per 100 g of an initial dry component's mass are equivalent to percentage mass increases.

RESULTS

PEM Mass Increases Due to Absorption

Figure 2:
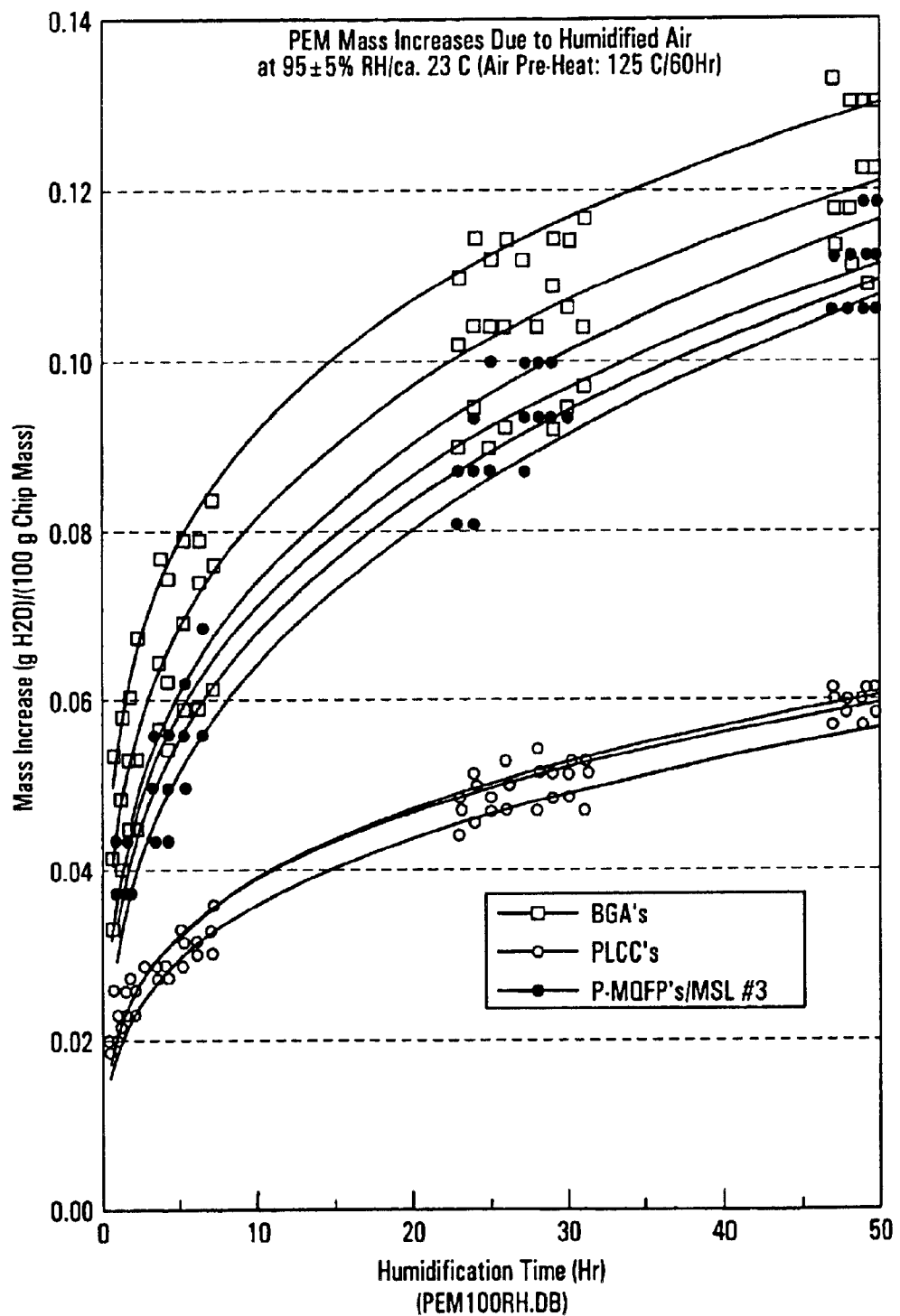
FIG. 2 is graph of mass increase due to humidified air at 95% RH and 23 C for a PEM.

The results of the PEM mass increase measurements due to the absorption of moisture, as corrected using the previously described methods of data reduction and analysis, are summarized in FIG. 2. For purposes of clarity, the data collected using only three of the nearly identical components 26 (of each type) have been plotted. The scatter in the individual data points, associated with each curve, gives a good indication of the precision (or lack thereof) of the evaluated experimental data. The actual curved lines that are drawn within this graph were generated using a least squares computer curve fitting routine that used only the data points associated with each specific PEM component. These curve fitted lines in FIG. 2 all had the same general form of: $Y=aX^b$, where a and b are constants for each line but differ from line to line. For X and Y coordinate values of 0 and 50 hr and 0 and 0.12 g $H_2O$/100 g Chip Mass, respectively, approximate values of a and b are 0.04 and 0.3.

FIG. 2 gives a good indication of the relative moisture absorption sensitivity of all of the PEM component types that were tested. Of these component types, the unrated (in terms of MSL) BGAs were most sensitive toward the absorption of moisture because, aside from slight statistical variations, this type of PEM was generally able to absorb more moisture, in any given time period (per 100 grams of initial dry chip mass), than either of the other two PEM component types. Although the P-MQFPs were less sensitive toward moisture absorption than the BGAs, the experimentally observed differences are not significant. Since the P-MQFPs had a MSL of 3, the BGAs were only slightly more sensitive toward the absorption of moisture. The actual BGA MSL rating was estimated to be within the range of 3 to 4. On the other hand, the PLCCs were the least sensitive PEM components that were tested since all of their least square curve fits were significantly below the BGA and P-MQFP curve fits.

Theoretical PEM Mass Increases Due to Absorption.

In addition to studying selected PEM moisture absorption rates, at typical ambient temperatures and at RH conditions near 100%, an evaluation of moisture absorption rates that could be expected at lower (and more typical) humidity levels was undertaken. However, collecting the original data, as well as employing the data reduction/analysis procedure that allowed generating FIG. 2, took a considerable period of time. Therefore, moisture absorption rates were estimated by theoretically modifying the "known" empirical equation that governs this kind of behavior.

Figure 3:
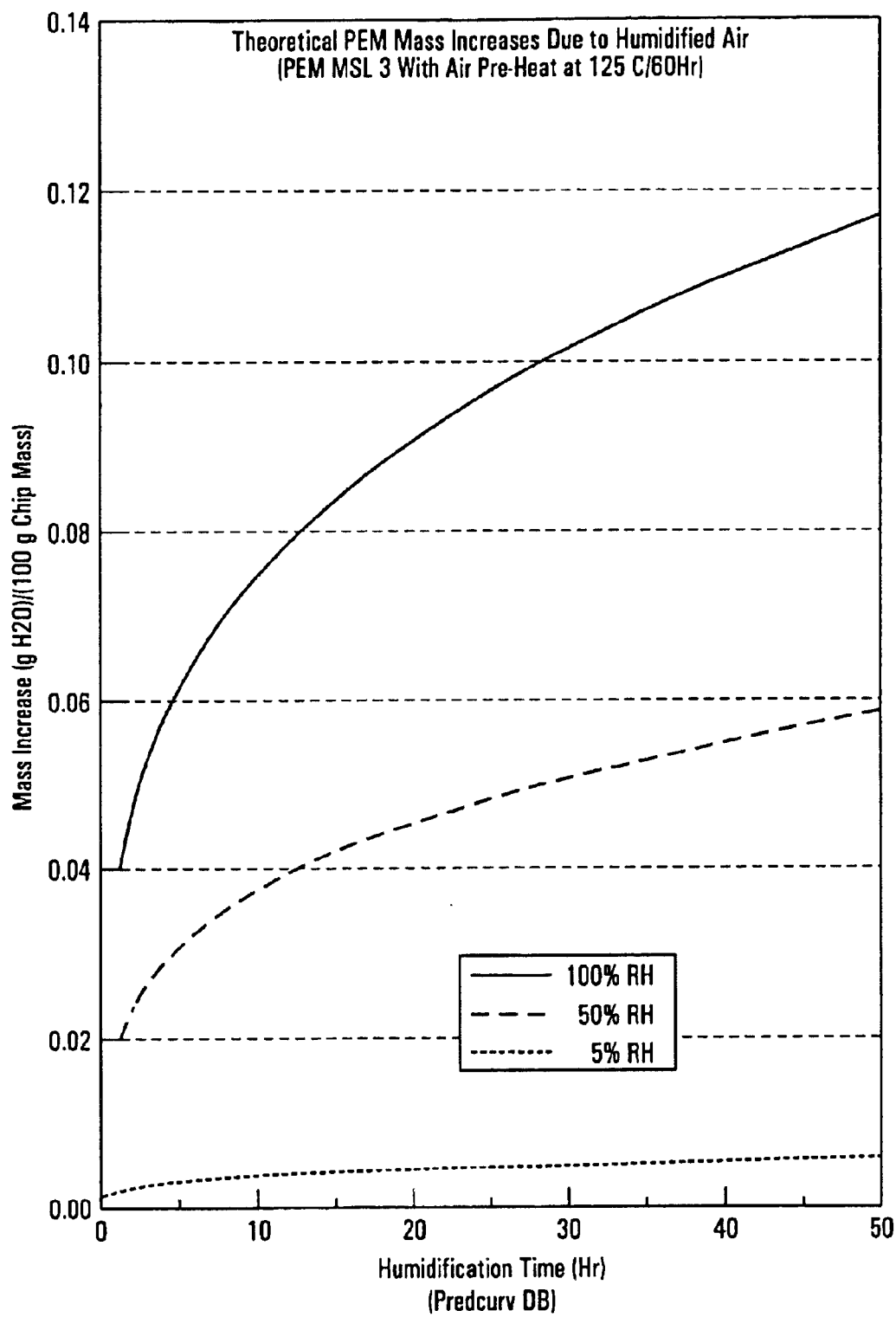
FIG. 3 is a graph of theoretical PEM mass increase due to humid air.

Recalling the equation $Y=aX^b$ (where a and b are constants for each line but differ from line to line), it was assumed that approximate respective values of a and b were 0.04 and 0.3, for a pre-dried PEM subjected to an inert moisture saturated gaseous atmosphere at ambient temperatures. If the exponential part of this governing curve (i.e., b) is a constant for each specific PEM, but the front end factor (i.e., a) is a variable that is directly proportional to the relative humidity in the inert gas, one can simply adjust this variable for any ambient RH level (between 0 and 100%) and thus theoretically generate the expected moisture absorption mass gain versus time curve. This is the procedure that was employed to generate the curves plotted in FIG. 3 for idealized, pre-dried, PEMs exposed to inert gaseous atmospheres at 5, 50, and 100% RH levels. The actual a values employed in generating these curves were, respectively: 0.0397(5/100), 0.0397(50/100), and 0.0397 (100/100). The b value, in all cases, was approximately 0.276.

Mass Increases in MQFPs Near 50 and 100% RH Levels

Figure 4:
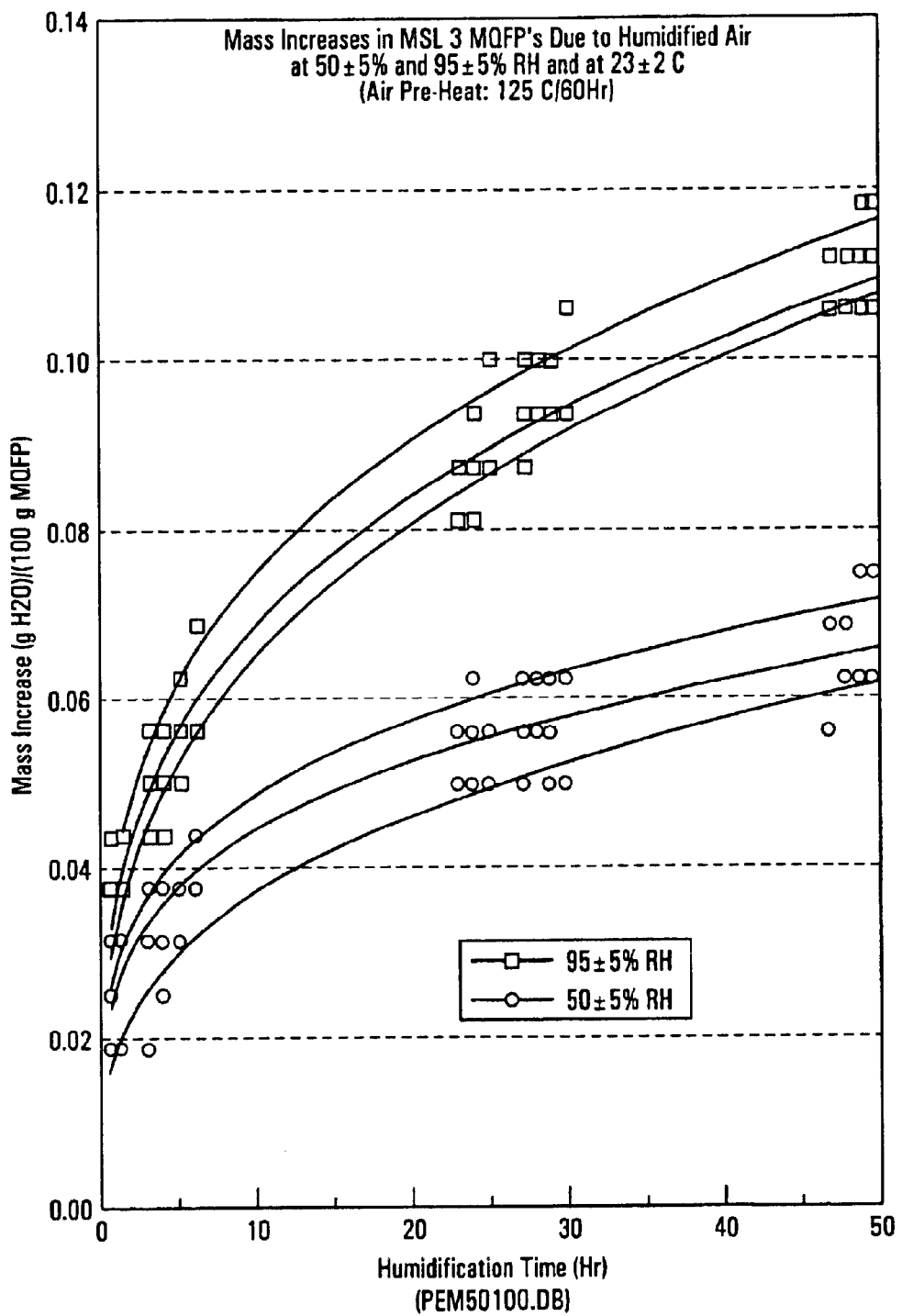
FIG. 4 is a graph of mass increase in MSL 3 MQFP's due to humidified air at 50 and 95% RH at 23 C.

In order to test the validity of the theoretical method of estimating moisture absorption properties of selected PEMs at RH levels below 100%, a series of additional measurements involving the moisture absorption properties of another set of P-MQFPs was made in the vicinity of 50% RH. These devices were preconditioned, by oven heating in air, in the same way as the original P-MQFPs that were exposed to moist air at the 95±5% RH level. Aside from their exposure to moist air at a RH humidity level of 50±5%, the method of obtaining the mass increase data (with respect to time) for these PEMs, as well as the data reduction and analysis procedure, was as described above. The graphical results of this effort, as well as re-plotted data for the same type of PEMs exposed to RH levels of 95±5%, have been illustrated within FIG. 4.

The predicted mass increases show good agreement with the experimental results using the assumption that mass increases are directly proportional to RH levels. However, averaged mass increases for the PEMs exposed to the 50% RH atmosphere were not exactly one-half of the averaged mass increases for the PEMs exposed to the 100% RH atmosphere, after the same exposure time. This discrepancy is, most likely, due to the fact that we did not have perfect control over PEM exposure temperatures or exact control over the actual RH that these PEMs were exposed to during this part of the study.

An additional consequence of these results is that entire "families" of absorption isotherms may be estimated theoretically, for specific pre-dried PEMs, by experimentally determining specific absorption isotherms at only one known level of RH in a moist gaseous atmosphere at ambient temperatures. However, this method of estimating amounts of moisture absorbed on specific pre-dried PEMs, as a function of time, is only good for total PEM exposure times on the order of 50 to 100 hr (allowing for some extrapolated accuracy) because the best curve fitting equation, obtained from the plotted experimental data, is only a good approximation at relatively short exposure times (possibly on the order of only 50 to 100 hr).

BGA and PLCC Moisture Losses Due to Heating in Air

The efficiency of the method of pre-drying the PEMs that were tested during the course of this experimental study was evaluated by making a series of additional mass versus time measurements using selected PEMs that had been pre-saturated with water vapor and then oven dried (in air). The data collection/reduction techniques that were employed during this part of the experimental study were as described above, except that these PEMs were periodically weighed during a heating/desorption process instead of during a humidification/absorption process.

Figure 5:
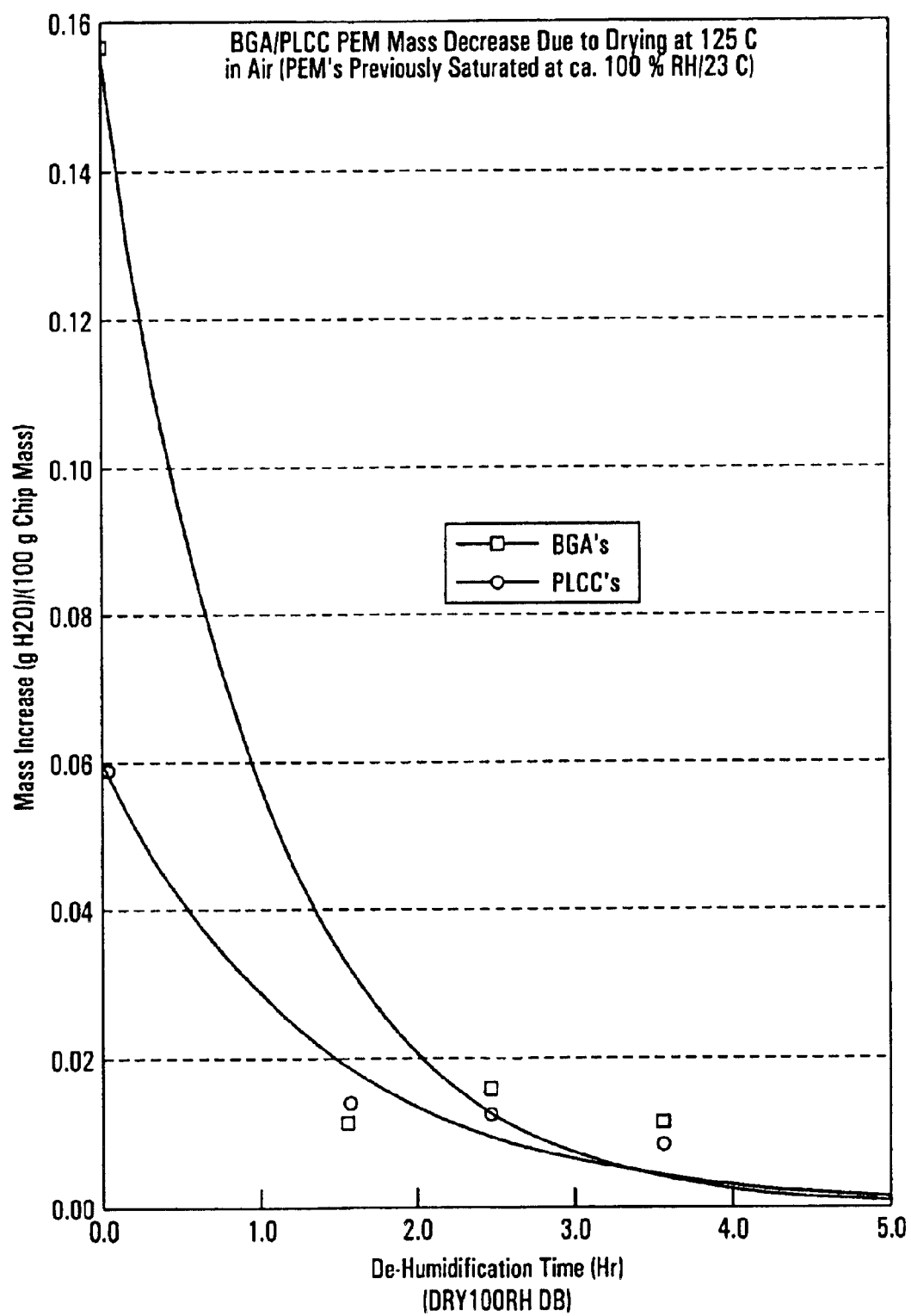
FIG. 5 is a graph of mass of water lost versus time for a BGA and a PLCC drying at 125 C.

The results of this effort have been plotted within FIG. 5. From these plotted 5 results, it is obvious that the removal rate of absorbed water, from the PEM specimens that were oven dried in the vicinity of 125 C, was very rapid. Within approximately 5.0 hr of heating time, practically all of the pre-absorbed water was driven out of these components. A conclusion that can be drawn from these results is that 60 hr of heating time, in the vicinity of 125 C, is more than adequate to remove practically all absorbed water vapor from similar PEM devices.

The results of this experimental study provide a quantitative indication of specific mass increases, due to moisture absorption in pre-dried PEM specimens. These results show that about 50% of the moisture absorbed during a 50 hr time period occurs within the first 5 hr of the total exposure time. These facts illustrate that even relatively short PEM exposure times, in very high RH environments, can be very serious with regard to the overall moisture absorption problem.

The experimental results also indicate that good predictions of overall moisture pickup (i.e., mass of moisture absorbed per 100 g of dry PEM mass versus time at any RH and at a specific temperature) can be obtained theoretically for specific PEM specimens if their moisture absorption versus time behavior can be accurately determined at only one known RH condition at that temperature. This result is significant because it enables the rapid development of complete "families" of absorption isotherms from a minimal amount of "real" experimental data. Tis result is even more significant in light of the fact that each type of encapsulating material, used either now or in the future, is likely to behave differently with respect to moisture absorption rates. So, any good approximation that can be used to minimize the time needed to characterize their behavior, with regard to moisture absorption, is useful.

Additional conclusions regarding the immediate storage of pre-dried PEMS within very dry air or dry nitrogen environments, until just prior to their use, are self evident.

What is claimed is:

1. A method of predicting moisture absorption rate in hygroscopic materials, the method comprising the steps of:
   i) drying a hygroscopic material for a time sufficient to remove residual moisture;
   ii) weighing said hygroscopic material;
   iii) placing said hygroscopic material within a substantially air tight chamber having a controllable atmosphere;
   iv) exposing said hygroscopic material to an environment of known controlled relative humidity in an inert gaseous atmosphere and controlled temperature;
   v) collecting data of moisture absorption over time and using a curve fitting technique to fit the data to a curve using the equation $$Y = aX^b$$

where:
   a is a constant ranging from about 0.001 to about 1.0;
   b is a constant ranging from about 0.01 to about 10.0;
   Y is the mass increase in grams H20 per 100 grams of material; and
   X is humidification time in hours;
   finding said constants a and b at said known controlled relative humidity and said controlled temperature for said hygroscopic material, assuming constant b is a constant value for said hygroscopic material, and constant a is a variable that is directly proportional to the relative humidity in an inert gaseous atmosphere; and modifying the variable a and holding the variable b constant to generate an expected moisture absorption mass gain versus time curve for a different specific relative humidity value.

2. The method of claim 1 wherein the known relative humidity ranges from about 5 to about 100%.

3. The method of claim 1 wherein said hygroscopic material is a Plastic Encapsulated Chip (PEM).

4. The method of claim 1 wherein relative humidity within said chamber is provided by wetted fibrous material disposed within said chamber.

5. The method of claim 1 further including an atmospheric probe positioned within said chamber for recording atmospheric conditions.

6. The method of claim 1 wherein relative humidity within said chamber is controlled by gas injected into said chamber via a gas inlet.

7. The method of claim 2 wherein the material is a PEM.

8. The method of claim 4 wherein said atmosphere is circulated by a fan positioned within said chamber.

9. The method of claim 4 further including an atmospheric probe positioned within said chamber for recording atmospheric conditions.

10. The method of claim 4 wherein the known relative humidity ranges from about 5 to about 100%.

11. The method of claim 4 wherein the material is a PEM.

12. The method of claim 6 further including an atmospheric probe positioned within said chamber for recording atmospheric conditions.

13. The method of claim 6 wherein the known relative humidity ranges from about 5 to about 100%.

14. The method of claim 6 wherein the material is a PEM.

15. The method of claim 8 further including an atmospheric probe positioned within said chamber for recording atmospheric conditions.

16. The method of claim 10 wherein the material is a PEM.

17. The method of claim 13 wherein the material is a PEM.

18. A method of predicting moisture absorption rate in PEM materials, the method comprising the steps of:
   i) drying a PEM for a time sufficient to remove residual moisture;
   ii) weighing said PEM;
   iii) placing said PEM within a substantially air tight chamber having a controllable atmosphere;
   iv) exposing the PEM to an environment having a controlled relative humidity ranging from 5 to 100% in an inert gaseous atmosphere and controlled temperature;
   v) collecting data of moisture absorption over time and using curve fitting technique to fit the data to a curve using the equation $$Y=aX^b$$

where:
   a is a constant ranging from about 0.001 to about 1.0;
   b is a constant ranging from about 0.01 to about 10.0;
   Y is the mass increase in grams H20 per 100 grams of said PEM; and
   X is humidification time in hours;
   finding said constants a and b at said known controlled relative humidity and said controlled temperature for said PEM, assuming constant b is a constant value for the PEM, and constant a is a variable that is directly proportional to the relative humidity in an inert gaseous atmosphere; and modifying the variable a and holding the variable b constant to generate an expected moisture absorption mass gain versus time curve for a different specific relative humidity value.

19. A method of predicting moisture absorption rate in hygroscopic materials, the method comprising the steps of:
   vi) drying said hygroscopic material for a time sufficient to remove residual moisture;
   vii) weighing said hygroscopic material;
   viii) placing said hygroscopic material within a substantially air tight chamber having a controllable atmosphere;
   ix) exposing said hygroscopic material to an environment of known controlled relative humidity in an inert gaseous atmosphere and controlled temperature;
   x) collecting data of moisture absorption over time and using a curve fitting technique to fit the data to a curve using the equation $$Y=aX^b$$

where:
   a is a constant ranging from about 0.001 to about 1.0;
   b is a constant ranging from about 0.01 to about 10.0;
   Y is the mass increase in grams H20 per 100 grams of material; and
   X is humidification time in hours;
   finding said constants a and b at said known controlled relative humidity and said controlled temperature for said hygroscopic material, assuming constant b is a constant value for said hygroscopic material, and constant a is a variable that is directly proportional to the relative humidity in an inert gaseous atmosphere;
   modifying the variable a and holding the variable b constant to generate an expected moisture absorption mass gain versus time curve for a different specific relative humidity value; and
   wherein the relative humidity within said chamber is provided by wetted fibrous material disposed within a chamber.

20. The method of claim 19 wherein said atmosphere is circulated by a fan positioned within said chamber.

21. The method of claim 19 further including an atmospheric probe positioned within said chamber for recording atmospheric conditions.

22. The method of claim 19 wherein relative humidity within said chamber is controlled by gas injected into said chamber via a gas inlet.

23. The method of claim 19 wherein the known relative humidity ranges from about 5 to about 100%.

24. The method of claim 19 wherein the material is a PEM.

* * * * *

UNITED STATES PATENT AND TRADEMARK OFFICE
CERTIFICATE OF CORRECTION

PATENT NO. : 6,816,812 B2
DATED : November 9, 2004
INVENTOR(S) : Frederick W. Giacobbe and Michael G. Pizzo It is certified that error appears in the above-identified patent and that said Letters Patent is hereby corrected as shown below:

Column 10,
Line 44, please replace the word "Chip" with the word -- Microchip --.

Signed and Sealed this

Twenty-second Day of February, 2005

JON W. DUDAS
*Director of the United States Patent and Trademark Office*